(12) United States Patent
Lee

(10) Patent No.: US 12,017,484 B2
(45) Date of Patent: Jun. 25, 2024

(54) INSERT FOR TIRE

(71) Applicant: Young Gi Lee, Gimhae-si (KR)

(72) Inventor: Young Gi Lee, Gimhae-si (KR)

( * ) Notice: Subject to any disclaimer, the term of this patent is extended or adjusted under 35 U.S.C. 154(b) by 37 days.

(21) Appl. No.: 17/112,217

(22) Filed: Dec. 4, 2020

(65) Prior Publication Data

US 2021/0086566 A1    Mar. 25, 2021

Related U.S. Application Data

(63) Continuation of application No. PCT/KR2020/004975, filed on Apr. 13, 2020.

(30) Foreign Application Priority Data

Sep. 2, 2019  (KR) .................. 10-2019-0107947
Nov. 14, 2019 (KR) .................. 10-2019-0145575

(51) Int. Cl.
*B60C 17/06*   (2006.01)
*B60C 5/12*    (2006.01)
*B60C 17/04*   (2006.01)

(52) U.S. Cl.
CPC .............. *B60C 17/065* (2013.01); *B60C 5/12* (2013.01); *B60C 17/041* (2013.01); *B60C 2200/12* (2013.01)

(58) Field of Classification Search
CPC ......... B60C 5/002; B60C 5/005; B60C 5/007; B60C 5/008; B60C 5/02; B60C 5/04; B60C 5/12; B60C 5/20; B60C 17/041; B60C 17/065; B60C 2200/12; B60C 7/101; B60C 7/1015; B60C 7/102; B60C 7/105; B60C 7/107; B60C 7/121; B60C 7/125

USPC .......................................................... 152/157
See application file for complete search history.

(56) References Cited

U.S. PATENT DOCUMENTS

| | | | |
|---|---|---|---|
| 1,215,577 A * | 2/1917 | Reeder ................... | B60C 7/121 152/320 |
| 1,464,709 A * | 8/1923 | Herzog ................. | B60C 19/122 152/157 |
| 1,585,875 A * | 5/1926 | Price ..................... | B60C 19/122 152/157 |
| 1,653,054 A * | 12/1927 | Mack ...................... | B60C 17/01 152/340.1 |
| 1,714,710 A | 5/1929 | Dalbey | |
| 2,680,463 A * | 6/1954 | Khalil .................... | B60C 17/01 152/339.1 |
| 3,064,704 A | 11/1962 | Richard | |

(Continued)

FOREIGN PATENT DOCUMENTS

| CN | 2705325 | 6/2005 |
|---|---|---|
| CN | 201427500 | 3/2010 |

(Continued)

OTHER PUBLICATIONS

Hioki K, JP-2001088516-A, machine translation. (Year: 2001).*

(Continued)

*Primary Examiner* — Sedef E Paquette
(74) *Attorney, Agent, or Firm* — Bridgeway IP Law Group, PLLC; Jihun Kim

(57) ABSTRACT

Provided is an insert for a tire, capable of being fastened together with a rim and a tire, the insert including a flow path connecting an upper surface and a lower surface of the insert.

13 Claims, 10 Drawing Sheets

(56) References Cited

U.S. PATENT DOCUMENTS

| | | | | |
|---|---|---|---|---|
| 4,059,138 | A | * | 11/1977 | Mirtain ................ B60C 17/08 152/158 |
| 4,177,848 | A | * | 12/1979 | Van der Burg ......... B60C 17/01 152/158 |
| 4,177,849 | A | * | 12/1979 | Osada ................... B60C 17/061 152/158 |
| 4,371,024 | A | | 2/1983 | Stein et al. |
| 4,592,403 | A | | 6/1986 | Setin et al. |
| 4,681,147 | A | * | 7/1987 | Hugele ................... B60C 17/06 152/158 |
| 5,080,737 | A | * | 1/1992 | Shoner ................... B29D 30/04 264/109 |
| 6,116,308 | A | | 9/2000 | Yoshida |
| 10,821,786 | B1 | * | 11/2020 | Roberts ................... B29C 33/40 |
| 2009/0165917 | A1 | | 7/2009 | Yee |
| 2010/0122758 | A1 | * | 5/2010 | Huang ................... B60C 7/105 152/157 |
| 2011/0000596 | A1 | * | 1/2011 | Sachdev ................ B60C 5/002 152/339.1 |
| 2012/0111463 | A1 | | 5/2012 | Seradarian et al. |
| 2013/0180641 | A1 | * | 7/2013 | French ................... B60C 5/08 152/450 |
| 2014/0261945 | A1 | * | 9/2014 | Kondo ................... B60C 19/122 152/511 |
| 2016/0167454 | A1 | * | 6/2016 | He ........................ B60C 17/065 152/157 |
| 2017/0057303 | A1 | | 3/2017 | Krefting |
| 2018/0281531 | A1 | * | 10/2018 | Parker ................... B60C 17/065 |
| 2018/0370303 | A1 | * | 12/2018 | Krefting ............. B60C 15/0209 |

FOREIGN PATENT DOCUMENTS

| | | | | | |
|---|---|---|---|---|---|
| CN | 201980028 | | | 9/2011 | |
| DE | 3332524 | A | * | 3/1985 | ............. B60C 17/06 |
| DE | 3439949 | A | * | 5/1986 | ............ B60C 15/028 |
| DE | 102017124487 | A1 | * | 4/2018 | ............ B60C 15/028 |
| JP | S55075503 | | | 5/1980 | |
| JP | S56128206 | | | 10/1981 | |
| JP | S59063208 | | | 4/1984 | |
| JP | H02141311 | | | 5/1990 | |
| JP | 2001088516 | A | * | 4/2001 | |
| JP | 2003146031 | | | 5/2003 | |
| JP | 2012210930 | A | * | 11/2012 | |

OTHER PUBLICATIONS

Hermann Stein, DE3332524A1, machine translation. (Year: 1985).*
Piepenbrin U, DE-3439949-A, machine translation. (Year: 1986).*
Baehr M, DE-102017124487-A1, machine translation. (Year: 2018).*
Kato N, JP-2012210930-A, machine translation. (Year: 2012).*
International Search Report—PCT/KR2020/004975 dated Jul. 10, 2020.
Korean Office Action—Korean Application No. 10-2019-0145575 dated Apr. 22, 2020, citing U.S. Pat. No. 1,714,710, US 2012/0111463, and U.S. Pat. No. 3,064,704.
Korean Office Action—Korean Application No. 10-2019-0145575 dated Dec. 17, 2019, citing U.S. Pat. No. 3,064,704 and US 2012/0111463.
Taiwanese Office Action—Taiwanese Application No. 109118052 dated Nov. 16, 2020, citing U.S. Pat. No. 4,592,403, U.S. Pat. No. 4,371,024, US 2009/0165917, JP H02-141311, CN 2705325, CN 201980028, and CN 201427500.
Japanese Office Action—Japanese Application No. 2021-503117 dated Feb. 1, 2022, citing JP S59-063208, JP S56-128206, US 2012/0111463, U.S. Pat. No. 1,585,875, U.S. Pat. No. 1,714,710, JP S53-159399, and US 2017-0057303.

* cited by examiner

FIG. 5
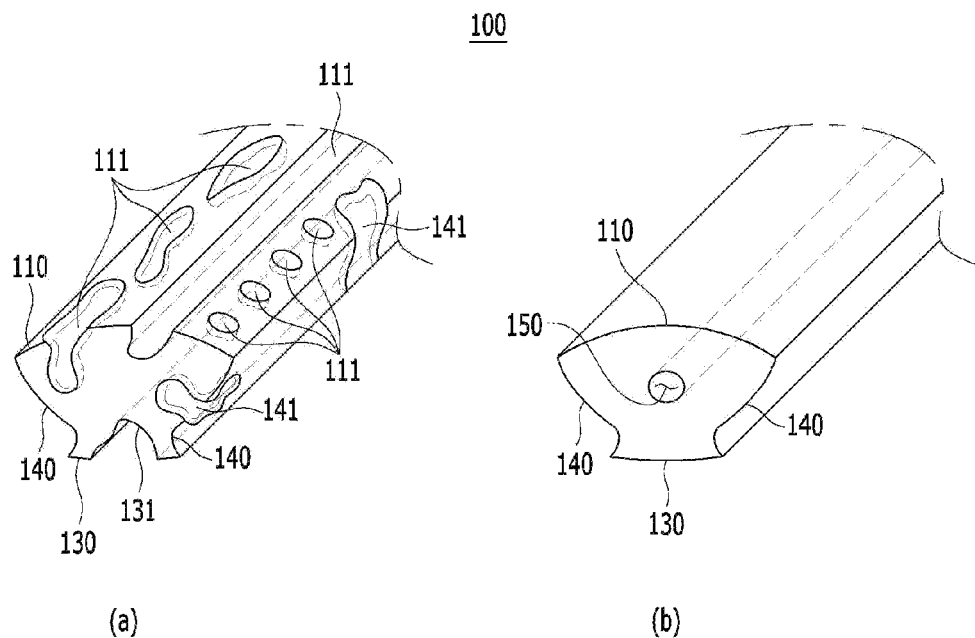
(a) (b)
[FIG. 6]
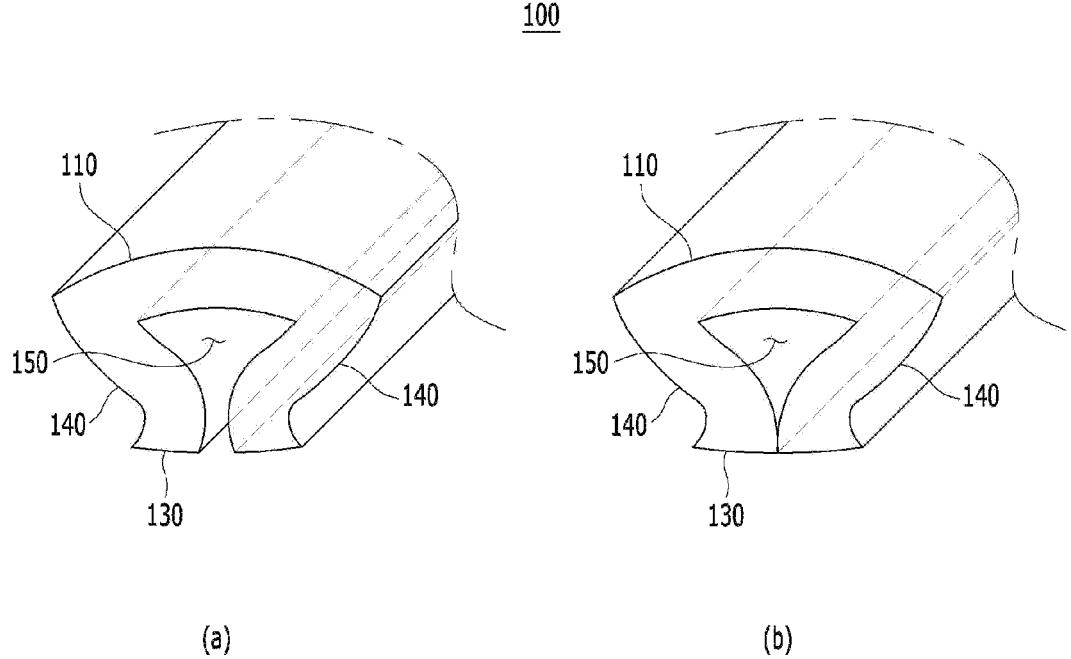
(a) (b)

INSERT FOR TIRE

BACKGROUND

Field

The present application relates to an insert for a tire.

Description of the Related Art

Recently, there is increasing awareness of environmentally friendly and low-carbon sports, and thus urban bicycles (sharing bicycles) are spreading all over the world. In addition, as the number of people who enjoy extreme sports using mountain bicycles and the like increases, technologies for tires of bicycles are being continuously developed. In the case of a pneumatic tire which is embedded with a tube and typically used, there is concern that the tire may be punctured when the tire is damaged by a sharp object during traveling.

Recently, there is an increasing demand for a solid tire in order to solve the problem. Because the solid tire is made of only rubber, for example, and air is not injected into the solid tire, there is no risk of puncture and the tire can be used for a long time.

However, the solid tire has a limitation in that the solid tire is heavier in weight than the pneumatic tire and has high rolling resistance. Accordingly, there is a need for developing technologies related to a tire that may ensure both the advantage of the solid tire capable of preventing puncture and the advantage of the pneumatic tire having low rolling resistance.

U.S. Patent Application Publication No. US 2017/0057303 A1 discloses an insert for a tire. The document in the related art relates to an insert for a tube tire that may be used together with an air tube, and the tube is structured such that air is injected directly into the air tube from an air injection part of a rim. However, the document in the related art does not absolutely recognize circulation of a fluid in the tire which affects rolling resistance, puncture, and the like of the tubeless tire.

SUMMARY

An object to be achieved by the present disclosure is to provide an insert for a tire capable of being applied to a tubeless tire.

Another object to be achieved by the present disclosure is to provide an insert for a tire capable of allowing a fluid in the tire to smoothly flow, absorbing external impact, and improving ride quality even in a state in which the insert is fastened to a rim and the tire.

Still another object to be achieved by the present disclosure is to provide an insert for a tire capable of being easily mounted when a tire and a rim are coupled.

However, technical problems to be solved by the exemplary embodiment of the present application are not limited to the aforementioned technical problem, and other technical problems may be present.

A first aspect of the present application provides an insert for a tire capable of being fastened together with a rim and a tire, the insert including a flow path connecting an upper surface and a lower surface of the insert.

According to the exemplary embodiment of the present application, the flow paths may include: a through flow path penetrating the lower surface and the upper surface of the insert; a lateral flow path formed in a lateral surface of the insert; or a coupling flow path connecting the through flow path and the lateral flow path, but the present disclosure is not limited thereto.

According to the exemplary embodiment of the present application, the rim may include a fluid injection part, and the through flow path and the lateral flow path may be directly or indirectly connected to the fluid injection part, but the present disclosure is not limited thereto.

According to the exemplary embodiment of the present application, the through flow path and the lateral flow path may be directly or indirectly connected to the fluid injection part through a lower flow path formed in the lower surface of the insert, but the present disclosure is not limited thereto.

According to the exemplary embodiment of the present application, the insert may further include a fluid receiving part connected to the fluid injection part, and the fluid receiving part may be connected to the through flow path, the lateral flow path, or the lower flow path, but the present disclosure is not limited thereto.

According to the exemplary embodiment of the present application, the insert may include an upper groove, a lower groove, a lateral groove, an inner hollow portion, or combinations thereof, but the present disclosure is not limited thereto.

According to the exemplary embodiment of the present application, the inner hollow portion may include an opening portion formed in a direction of the lower surface of the insert, and two ends of the opening portion may be mechanically or chemically bound, but the present disclosure is not limited thereto.

According to the exemplary embodiment of the present application, the lower groove may include a protruding portion, but the present disclosure is not limited thereto.

According to the exemplary embodiment of the present application, the insert may include an upper groove having a slit shape, a lower groove, or a through hole, and a horizontal width of the slit may be smaller than a length between two hooks of the rim, but the present disclosure is not limited thereto.

According to the exemplary embodiment of the present application, the lower groove or the inner hollow portion may include an inner pleated portion, but the present disclosure is not limited thereto.

According to the exemplary embodiment of the present application, in a state in which the insert for a tire, the tire, and the rim are coupled, a ratio $h_i/h_t$ of a maximum height $h_i$ of the insert from an imaginary horizontal surface between two hooks of the rim to a maximum height $h_t$ of an interior of the tire from the imaginary horizontal surface between the two hooks of the rim may be 0.15 to 0.9, but the present disclosure is not limited thereto.

According to the exemplary embodiment of the present application, in a state in which the insert for a tire, the tire, and the rim are coupled, the insert for a tire has hardness equal to or higher than Shore C hardness of 20 and equal to or lower than Shore A hardness of 90, and a ratio $w_i/w_t$ of a horizontal/transverse diameter $w_i$ of the insert to a horizontal/transverse diameter $w_t$ of the tire may be 0.1 to 1.3, but the present disclosure is not limited thereto.

According to the exemplary embodiment of the present application, the tire may be a tubeless tire, but the present disclosure is not limited thereto.

A second aspect of the present application provides a tire fastening structure in which the tire and the insert for a tire are fastened to the rim.

A third aspect of the present application provides a transportation means including the insert for a tire.

The technical solution is just illustrative but should not be interpreted as being intended to limit the present application. In addition to the above-mentioned exemplary embodiment, additional exemplary embodiments may be present in the drawings and the detailed description of the invention.

According to the present disclosure, since the insert for a tire according to the present application is provided in the tubeless tire, it is possible to prevent damage to the rim caused by external impact when the tubeless tire is used. In addition, in the event of the puncture of the tire, the tire including the insert for a tire may operate as a run flat tire.

Since the insert for a tire according to the present application has the flow path, the fluid in the tire may smoothly flow even in the state in which the insert is fastened together with the rim and the tire.

The tire including the insert for a tire according to the present application may absorb impact well, improve ride quality, and achieve excellent rolling resistance.

Further, the insert for a tire may be easily coupled to and mounted on the tire and the rim.

However, the effects, which can be obtained by the present application, are not limited to the above-mentioned effects, and other effects may be present.

BRIEF DESCRIPTION OF THE DRAWINGS

The above and other aspects, features and other advantages of the present disclosure will be more clearly understood from the following detailed description taken in conjunction with the accompanying drawings, in which.

Figure 7:
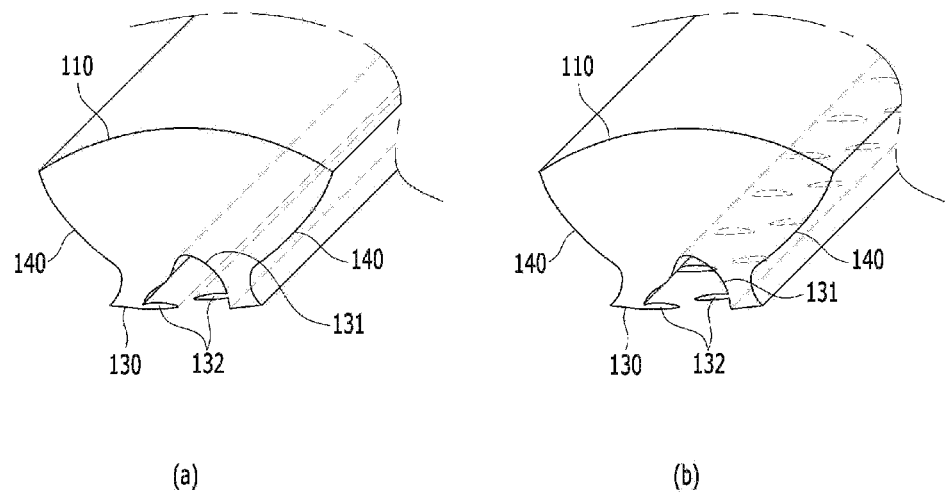
Figure 8:
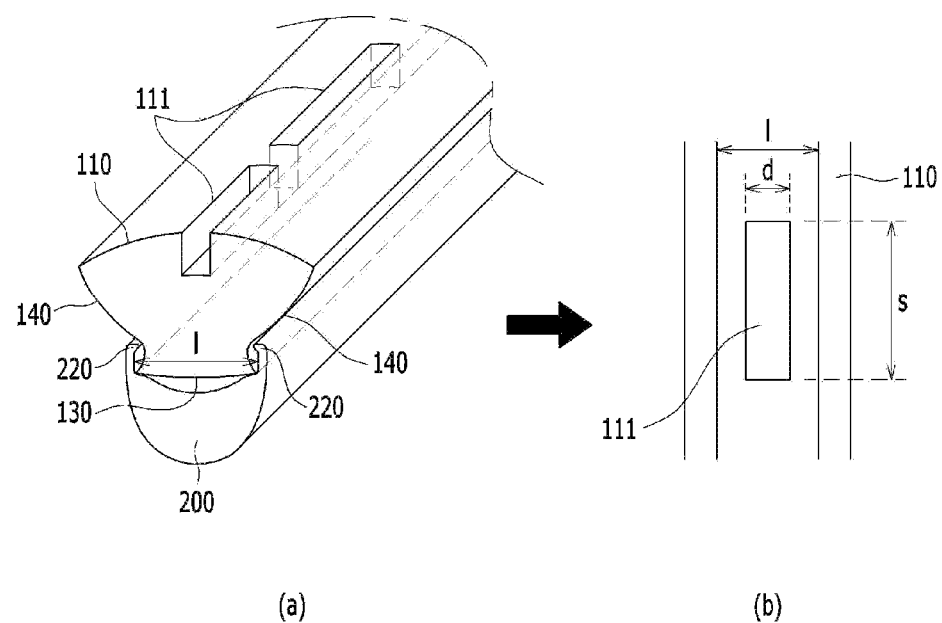
Figure 9:
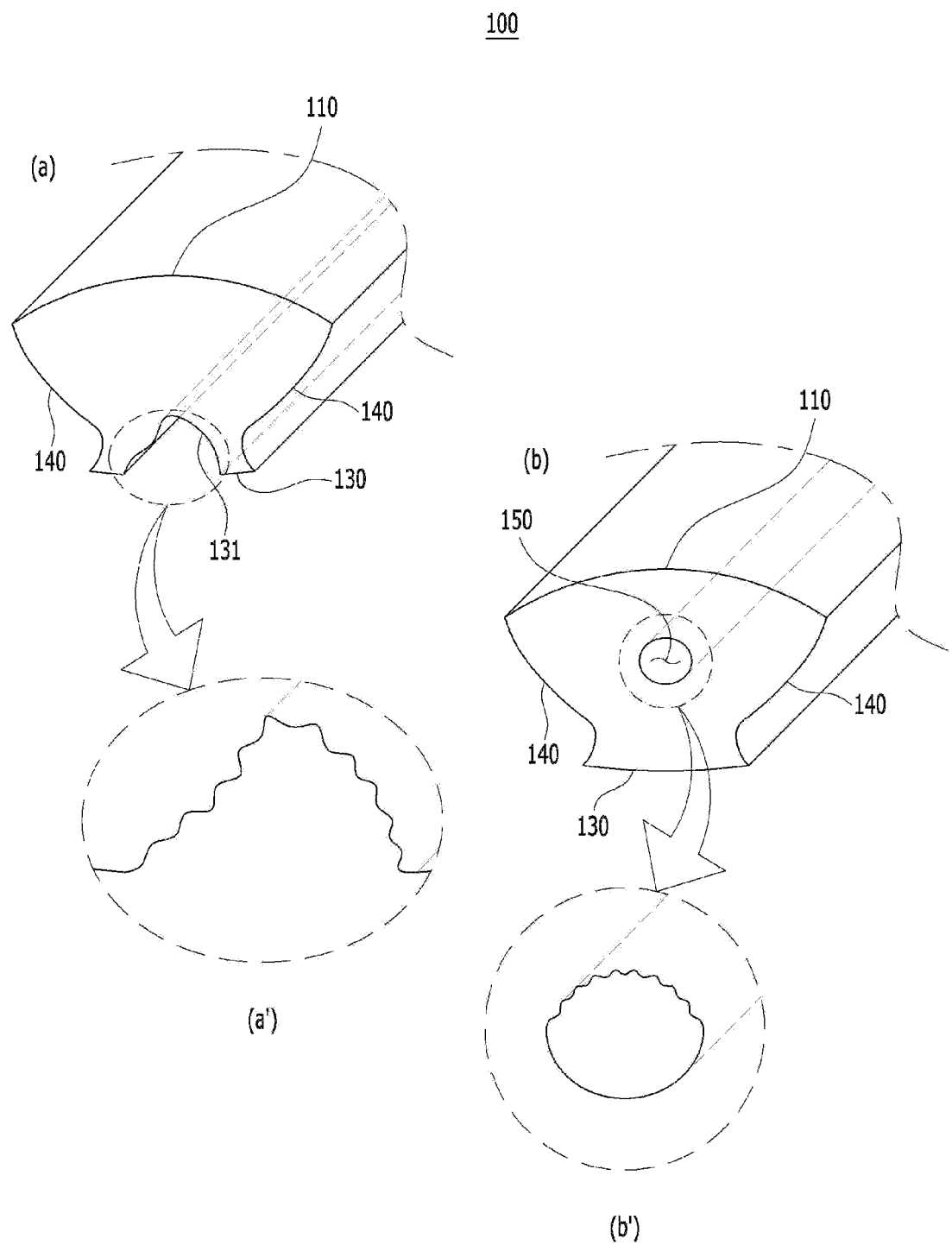
Figure 10:
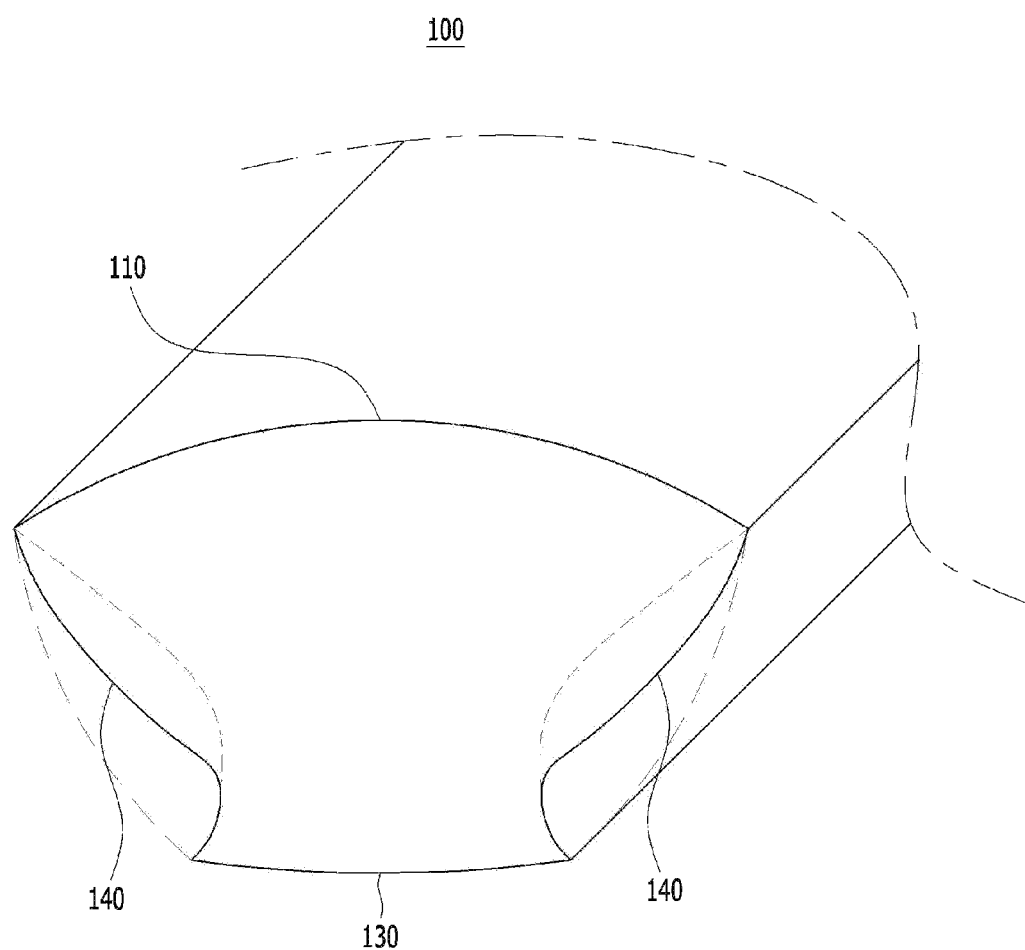
Figure 11:
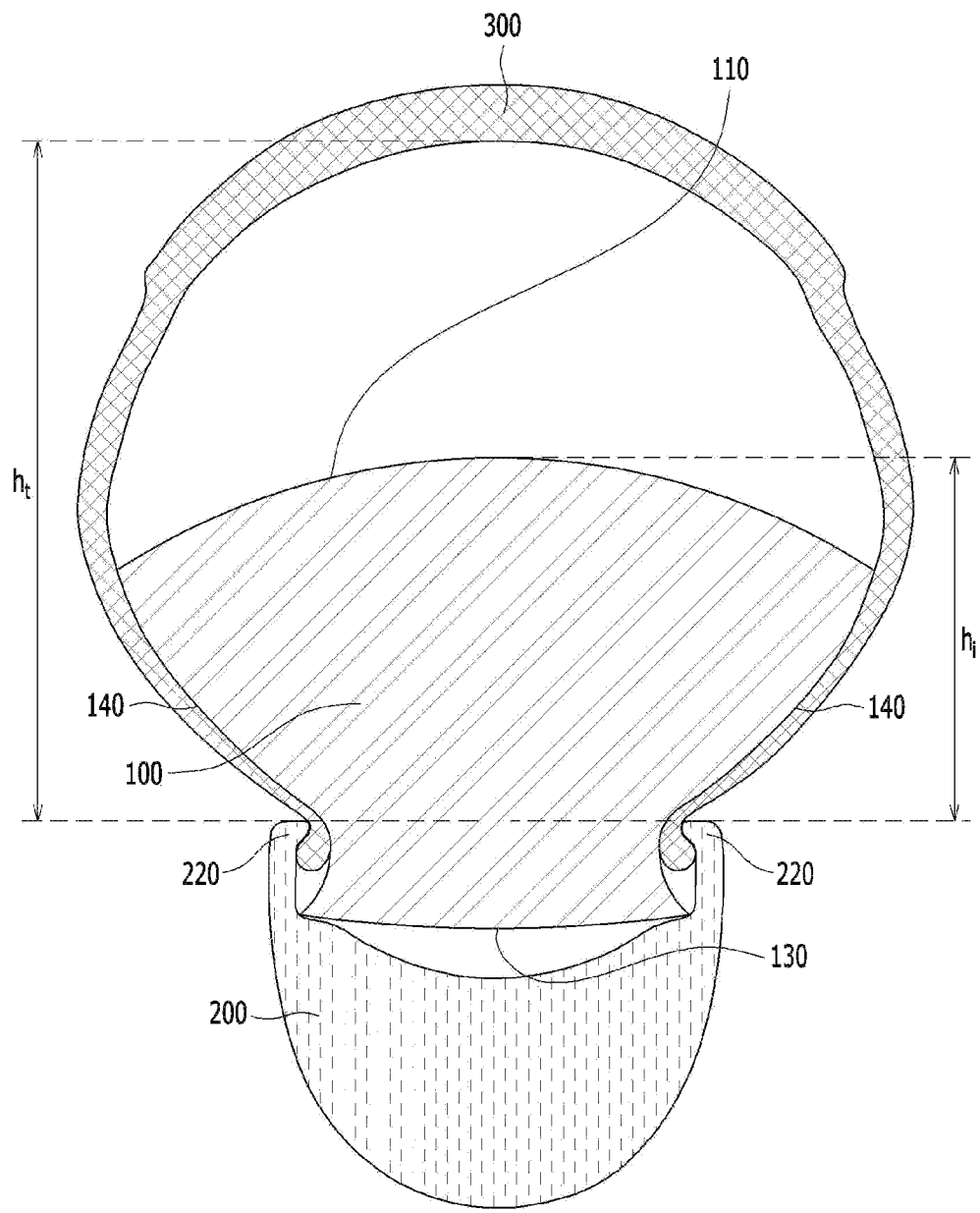
Figure 12:
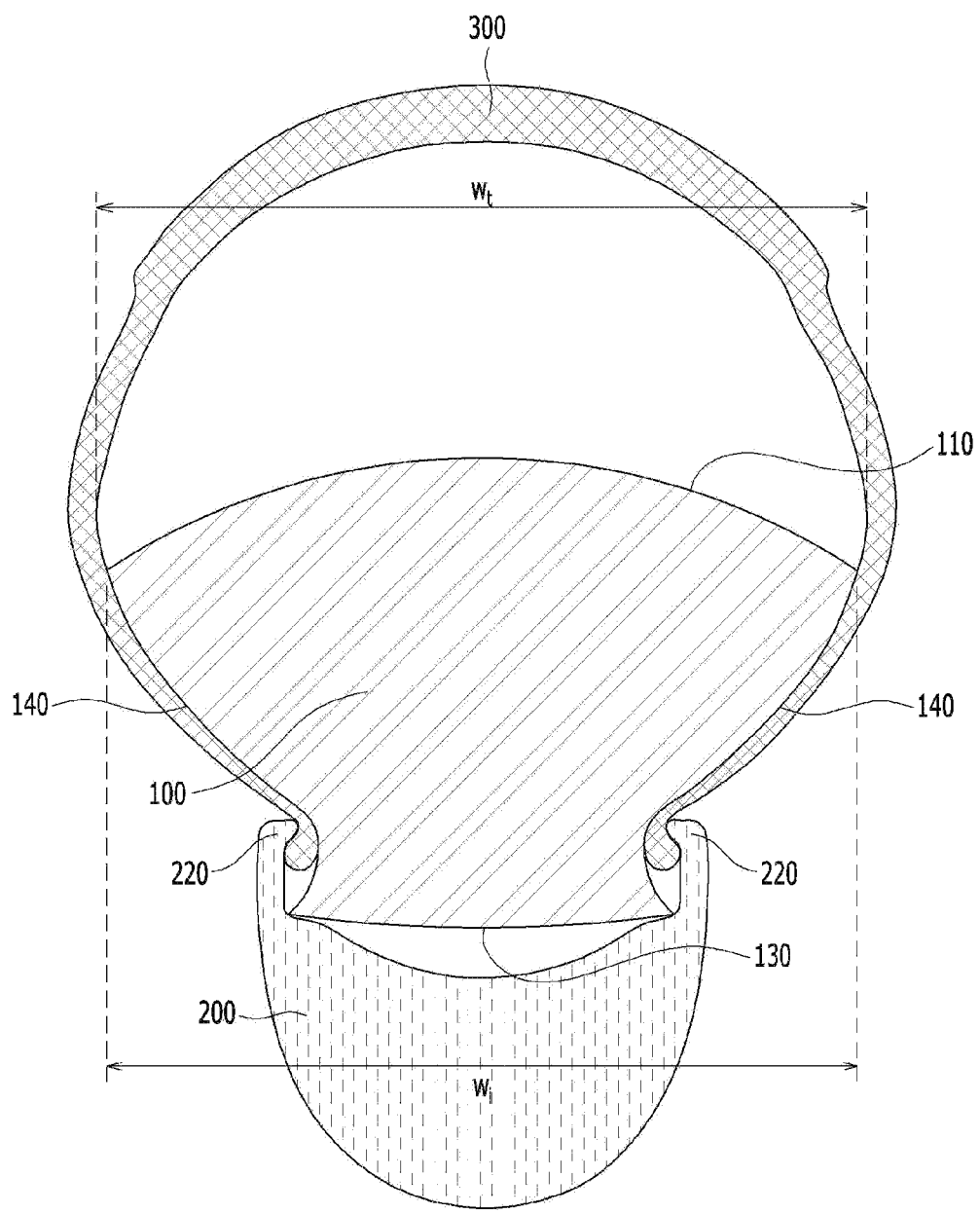

(a) of FIG. 5 and (b) of FIG. 5 are views illustrating examples of upper grooves, a lower groove, lateral grooves, inner hollow portions, and the like of the insert for a tire according to the exemplary embodiment of the present application;

(a) of FIG. 6 is a view illustrating a state in which an opening portion of the inner hollow portion of the insert for a tire according to the exemplary embodiment of the present application is opened; (b) of FIG. 6 is a view illustrating a state in which the opening portion of the inner hollow portion of the insert for a tire according to the exemplary embodiment of the present application is bound;

(a) of FIG. 7 and (b) of FIG. 7 are views illustrating examples of protruding portions in the lower groove of the insert for a tire according to the exemplary embodiment of the present application;

(a) of FIG. 8 is a view illustrating a state in which the insert for a tire according to the exemplary embodiment of the present application, which has the upper groove having a slit shape, is fastened to the rim; (b) of FIG. 8 is an enlarged view of the slit-shaped upper groove of the insert for a tire illustrated in (a) of FIG. 8 when viewed from above;

(a) of FIG. 9 is a view illustrating the insert for a tire according to the exemplary embodiment of the present application having the lower groove; (a') of FIG. 9 is a view illustrating an inner pleated portion of the lower groove of the insert for a tire illustrated in (a) of FIG. 9; (b) of FIG. 9 is a view illustrating the insert for a tire according to the exemplary embodiment of the present application having the inner hollow portion; and (b') of FIG. 9 is a view illustrating an inner pleated portion of the inner hollow portion of the insert for a tire illustrated in (b) of FIG. 9;

FIG. 10 is a view illustrating an example of a lateral side of the insert for a tire according to the exemplary embodiment of the present application;

FIG. 11 is a view illustrating a maximum height of an interior of the tire from an imaginary horizontal surface between two hooks of the rim and a maximum height of the insert from the imaginary horizontal surface between the two hooks of the rim in the state in which the insert for a tire according to the exemplary embodiment of the present application is coupled to the tire and the rim; and FIG. 12 is a view illustrating a horizontal/transverse diameter of the tire and a horizontal/transverse diameter of the insert in the state in which the insert for a tire according to the exemplary embodiment of the present application is coupled to the tire and the rim.

DETAILED DESCRIPTION OF THE EMBODIMENT

However, the present application may be implemented in various different ways and is not limited to the exemplary embodiments described herein. However, the present application may be implemented in various different ways and is not limited to the exemplary embodiments described herein. A part irrelevant to the description will be omitted in the drawings in order to clearly describe the present application, and similar constituent elements will be designated by similar reference numerals throughout the specification.

Throughout the specification of the present application, when one constituent element is referred to as being "connected to" another constituent element, one constituent element can be "directly connected to" the other constituent element, and one constituent element can also be "electrically connected to" or "indirectly connected to" the other element with other elements therebetween.

Throughout the specification, when one member is disposed "on", "at an upper side of", "at an upper end of", "below", "at a lower side of", or "at a lower end of" another member in the present specification of the present application, this includes not only a case where the one member is brought into contact with another member, but also a case where still another member is present between the two members.

Throughout the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

Throughout the specification, the term "combination(s) of" included in Markush type description means mixture or combination of one or more constituent elements selected from a group consisting of constituent elements described in Markush type and thus means that the disclosure includes one or more constituent elements selected from the Markush group.

A first aspect of the present application relates to an insert for a tire capable of being fastened together with a rim and a tire and provides the insert for a tire including a flow path connecting an upper surface and a lower surface of the insert.

Hereinafter, the insert for a tire according to the exemplary embodiment of the present application will be specifically described with reference to the drawings. However, the present application is not limited to the exemplary embodiments and the drawings.

The insert for a tire according to the first aspect of the present application may be formed in a ring or doughnut shape, for example, and fastened to (mounted on) the rim along a circumference of the rim. For example, the insert for a tire according to the present application may be manufactured by, but not limited to, an injection foaming process. As another example, the insert for a tire may be manufactured by an extrusion process, cut to a desired length, and then used in a state in which both ends of the insert are connected to each other. In addition, the insert according to the present application may include, for example, but not limited to, a material selected from a group consisting of natural rubber, synthetic rubber, thermosetting resin, thermoplastic resin, and combinations thereof.

Meanwhile, FIGS. 2 to 10 are views assuming states in which the rim and the insert for a tire according to the exemplary embodiment of the present application originally having a ring shape are partially cut and spread straight.

Figure 1:
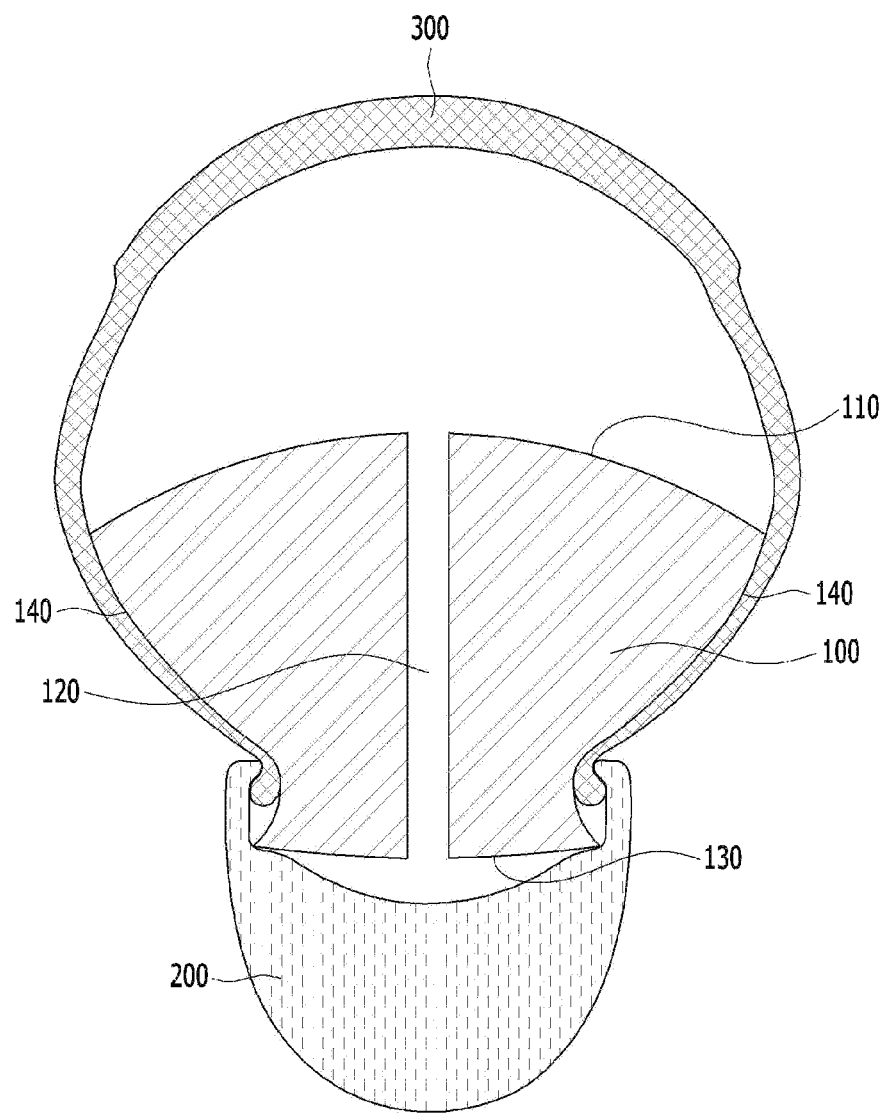
FIG. 1 is a view illustrating a cross section in a state in which an insert for a tire according to the exemplary embodiment of the present application is fastened together with a rim and a tire.

FIG. 1 is a view illustrating a cross section in a state in which the insert for a tire according to the exemplary embodiment of the present application is fastened together with the rim and the tire.

Referring to FIG. 1, an insert 100 for a tire according to an exemplary embodiment of the present application includes an upper surface 110 and a lower surface 130. The upper surface 110 of the insert means a surface directed toward a portion (tread) of a tire 300 which comes into contact with the ground surface in a state in which the insert 100 is fastened to a rim 200 and the tire 300. The lower surface 130 of the insert means a surface directed toward a center of the rim 200 in the state in which the insert 100 is fastened to the rim 200 and the tire 300.

In addition, the insert 100 includes a flow path 120 that connects the upper surface 110 of the insert and the lower surface 130 of the insert.

Specifically, referring to FIG. 1, the flow path 120 is connected such that a fluid flows from a lower space below the lower surface 130 to an upper space above the upper surface 110. Therefore, the fluid, which is injected through a fluid injection part 210 (see FIG. 3) provided in the rim 200, may smoothly move to the upper space above the upper surface 110 even in the state in which the insert 100 is fastened to the rim 200 and the tire 300.

On the contrary, during a process in which the fluid stored in the upper space above the upper surface 110 moves to the lower space below the lower surface 130 so as to be discharged, pressure is applied to the upper surface 110 in a direction from above to below, and as a result, the insert 100 comes into close contact with the rim 200, and a gap between a lateral surface 140 of the insert and an inner surface of the tire 300 is removed, such that the fluid may be hardly discharged. In this case, when the flow path 120 is provided, the fluid may be discharged through the flow path 120 without difficulty. Therefore, since the insert 100 for a tire according to the exemplary embodiment of the present application includes the flow path 120, it is easy to inject the fluid into the tire 300 or discharge the fluid from the tire 300.

In addition, when a transportation means travels in the state in which the insert 100 is fastened to the rim 200 and the tire 300, the fluid may be smoothly circulated in the tire 300 through the flow path 120, thereby improving ride quality.

For example, the fluid may be, but not limited to, a gas such as air, nitrogen, or oxygen, a sealant composition containing polypropylene glycol, a liquid such as a liquid polymer, or a combination thereof.

The gas such as air is injected into the tire 300 in the state in which the insert 100 is fastened to the tire 300 and the rim 200, and the gas may serve to reduce rolling resistance and improve ride quality.

The liquid is injected into the tire 300 in the state in which the insert 100 is fastened to the tire 300 and the rim 200, and the liquid may serve to reduce rolling resistance, improve braking force, and reduce deformation of the tire.

In particular, the fluid, for example, the sealant composition liquid may freely move in the tire 300 along the upper and lower surfaces of the insert 100. In the event of the puncture of the tire 300, the sealant composition moves to the portion where the puncture occurs and blocks the puncture, such that the tire may be restored by itself.

That is, even in the state in which the insert 100 is fastened to the tire 300 and the rim 200, the fluid may be injected, and the injected fluid may freely move in the upper and lower spaces of the insert 100.

Referring to FIG. 1, for example, the flow path 120 may be penetratively connected from the lower surface 130 to the upper surface 110 straight, but the present disclosure is not limited thereto. As another example, the flow path 120 may be connected along the lateral surface 140. Examples of the flow path 120, which may be implemented in various forms, will be specifically described below with reference to FIG. 2. Meanwhile, one or more flow paths 120 may be provided in the entire insert 100. When the plurality of flow paths 120 is provided, the flow paths 120 are provided at predetermined intervals in a circumferential direction, but the present disclosure is not limited thereto.

According to the exemplary embodiment of the present application, the flow paths 120 of the insert 100 for a tire may include through flow paths 121 penetrating the lower surface 130 and the upper surface 110 of the insert 100, lateral flow paths 122 formed in the lateral surface 140 of the insert or coupling flow paths 123 connecting the through flow paths 121 and the lateral flow paths 122, but the present disclosure is not limited thereto.

Figure 2:
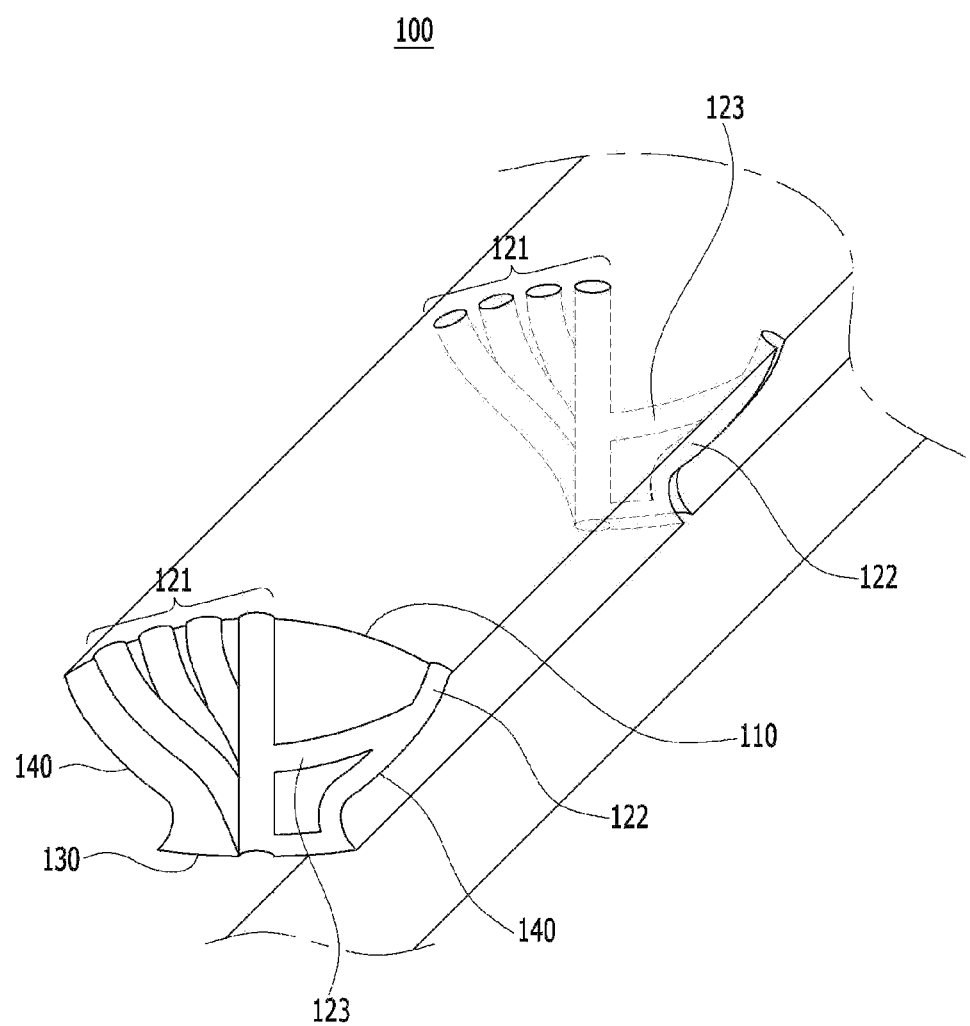
FIG. 2 is a view illustrating an example of a flow path of the insert for a tire according to the exemplary embodiment of the present application.

FIG. 2 is a view illustrating an example of the flow path of the insert for a tire according to the exemplary embodiment of the present application.

The through flow path 121 may mean a flow path penetrating the inside of the insert 100 while connecting the lower surface 130 and the upper surface 110. That is, the through flow path 121 may mean a flow path having a periphery surrounded by the material of the insert 100. Referring to FIG. 2, the through flow path 121 may be formed in a vertical direction, for example. As another example, the through flow path 121 may be curved or bent. As still another example, the through flow path 121 may be formed in a spiral shape, but the present disclosure is not limited thereto.

The lateral flow path 122 may be formed in the lateral surface 140 of the insert. At least a part of the lateral flow path 122 may be in contact with the inner surface of the tire 300 in the state in which the rim 200 and the tire 300 are fastened. That is, the lateral flow path 122 may be construed as a gap between the lateral surface 140 of the insert and the inner surface of the tire 300. In addition, at least a part of the lateral flow path 122 may be formed along the lower surface 130 of the insert so as to be connected to the lateral surface 140. Referring to FIG. 2, for example, the lateral flow path 122 may be formed to the right along the lower surface 130 so as to be connected to the lateral surface 140 and formed along the lateral surface 140 so as to be connected to the upper surface 110.

The coupling flow path 123 may be a flow path connecting the through flow path 121 and the lateral flow path 122. At least a part of the coupling flow path 123 may be connected to penetrate the inside of the insert 100. In addition, at least a part of the coupling flow path 123 may be formed in the lateral surface 140 of the insert. Referring to FIG. 2, for example, the coupling flow path 123 may be structured such that the coupling flow path 123 is formed to partially penetrate the inside of the insert 100 in the direction from the lower surface 130 to the upper surface 110, curved (bent) in the direction of the lateral surface 140, connected to the lateral surface 140, and then connected to the upper surface 110 along the lateral surface 140. In this case, the flow path connected from the lower surface 130 to the lateral surface 140 may correspond to the through flow path 121, and the flow path connected to the upper surface 110 along the lateral surface 140 may correspond to the lateral flow path 122. As another example, the coupling flow path 123 may be connected to the lower surface 130 through the lateral flow path 122 and connected to the upper surface 110 through the through flow path 122. As still another example, the coupling flow path 123 may be connected to the lower surface 130 through the through flow path 121, the through flow path 121 may be connected to the lateral flow path 122, and the lateral flow path 122 may be connected to another through flow path 121 different from the through flow path 121 and then connected to the upper surface 110, but the present disclosure is not limited thereto.

Meanwhile, FIG. 2 schematically illustrates the shapes of the through flow path 121, the lateral flow path 122, and the coupling flow path 123 in the cross section of the insert 100 in which the through flow path 121, the lateral flow path 122, and the coupling flow path 123 are indicated by solid lines. Further, FIG. 2 schematically illustrates the shapes of the through flow path 121, the lateral flow path 122, and the coupling flow path 123 positioned in the insert 100 in which the through flow path 121, the lateral flow path 122, and the coupling flow path 123 are indicated by dotted lines.

According to the exemplary embodiment of the present application, the rim 200 may include the fluid injection part 210, and the through flow path 121 and the lateral flow path 122 may be directly or indirectly connected to the fluid injection part 210, but the present disclosure is not limited thereto.

Figure 3:
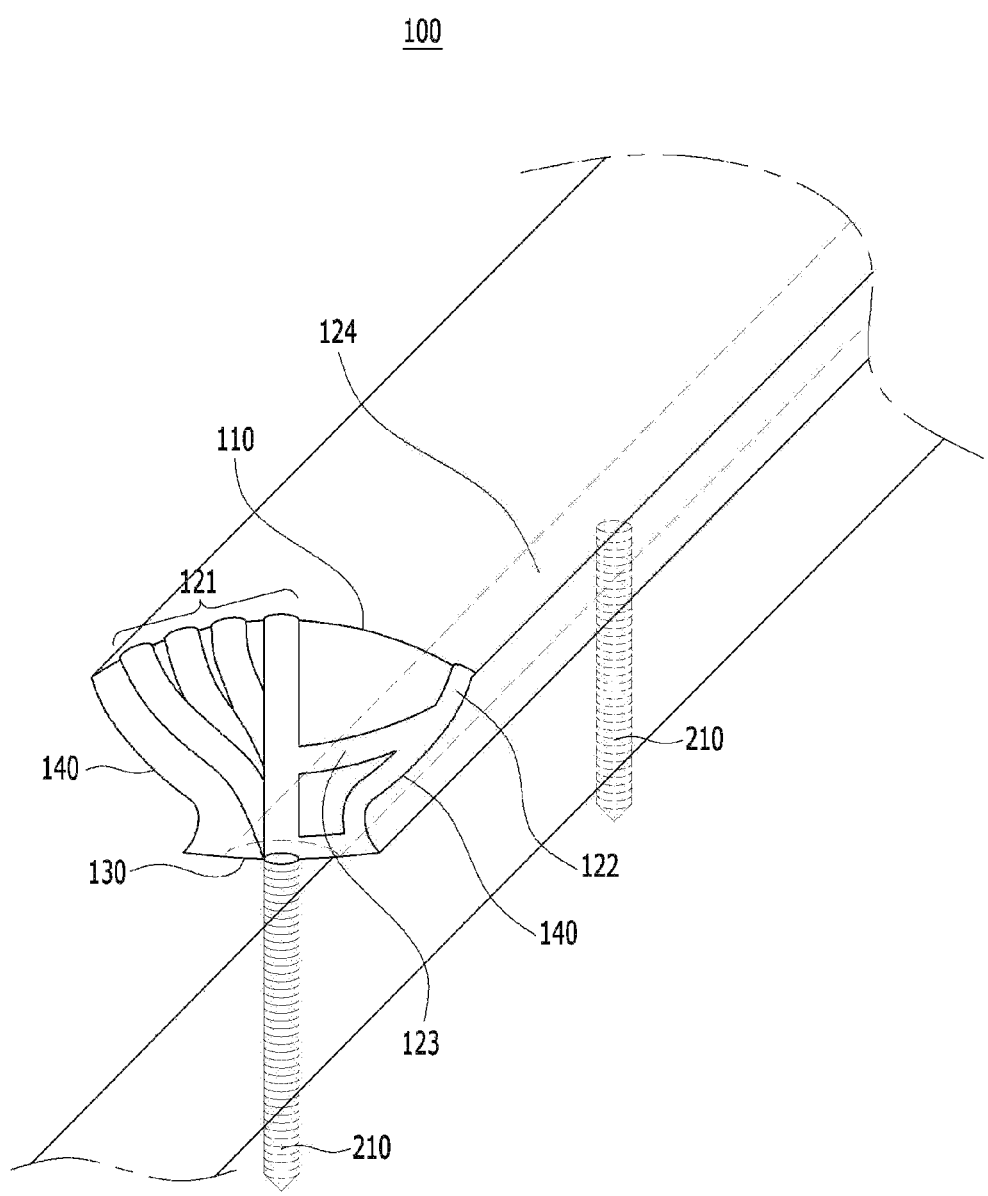
FIG. 3 is a view illustrating a state in which the flow path of the insert for a tire according to the exemplary embodiment of the present application is connected to a fluid injection part of the rim.

FIG. 3 is a view illustrating a state in which the flow path of the insert for a tire according to the exemplary embodiment of the present application is connected to the fluid injection part.

In the case in which the insert 100 for a tire according to the exemplary embodiment of the present application is fastened together with the tire 300 and the rim 200 including the fluid injection part 210, the fluid injected through the fluid injection part 210 may be introduced into at least one of the through flow path 121 and the lateral flow path 122. Meanwhile, since the coupling flow path 123 connects the through flow path 121 and the lateral flow path 122, the fluid injected through the fluid injection part 210 may in turn be introduced into at least one of the through flow path 121 and the lateral flow path 122 even in the case in which the fluid injection part 210 is connected to the coupling flow path 123.

Referring to the fluid injection part 210 indicated by the solid line in FIG. 3, the fluid injection part 210 may be directly connected to at least one of the through flow path 121 and the lateral flow path 122. In this case, the fluid injected through the fluid injection part 210 may be directly introduced into the through flow path 121 and the lateral flow path 122. Referring to the fluid injection part 210 indicated by the dotted line in FIG. 3, the fluid injection part 210 may be indirectly connected to at least one of the through flow path 121 and the lateral flow path 122. In this case, the fluid injected through the fluid injection part 210 moves in the lower space below the lower surface 130 of the insert and then enters at least one of the through flow path 121 and the lateral flow path 122.

According to the exemplary embodiment of the present application, the through flow path 121 and the lateral flow path 122 may be directly or indirectly connected to the fluid injection part 210 through a lower flow path 124 formed in the lower surface 130 of the insert 100, but the present disclosure is not limited thereto.

Referring to FIG. 3, when the lower flow path 124 is formed, the fluid injected through the fluid injection part 210 may smoothly move from a position, at which the fluid is injected through the lower flow path 124, to another position. In particular, the effect may be more greatly exhibited when the through flow path 121 and the lateral flow path 122 are indirectly connected to the fluid injection part 210. In addition, when the fluid smoothly flows, it is possible to reduce the time and effort required to inject the fluid into the tire 300 or remove the fluid from the tire 300 in the state in which the insert 100 for a tire according to the exemplary embodiment of the present application is fastened together with the rim 200 and the tire 300.

According to the exemplary embodiment of the present application, the insert 100 may further include a fluid receiving part 125 connected to the fluid injection part 210, and the fluid receiving part 125 may be connected to the through flow path 121, the lateral flow path 122, or the lower flow path 124, but the present disclosure is not limited thereto.

Figure 4:
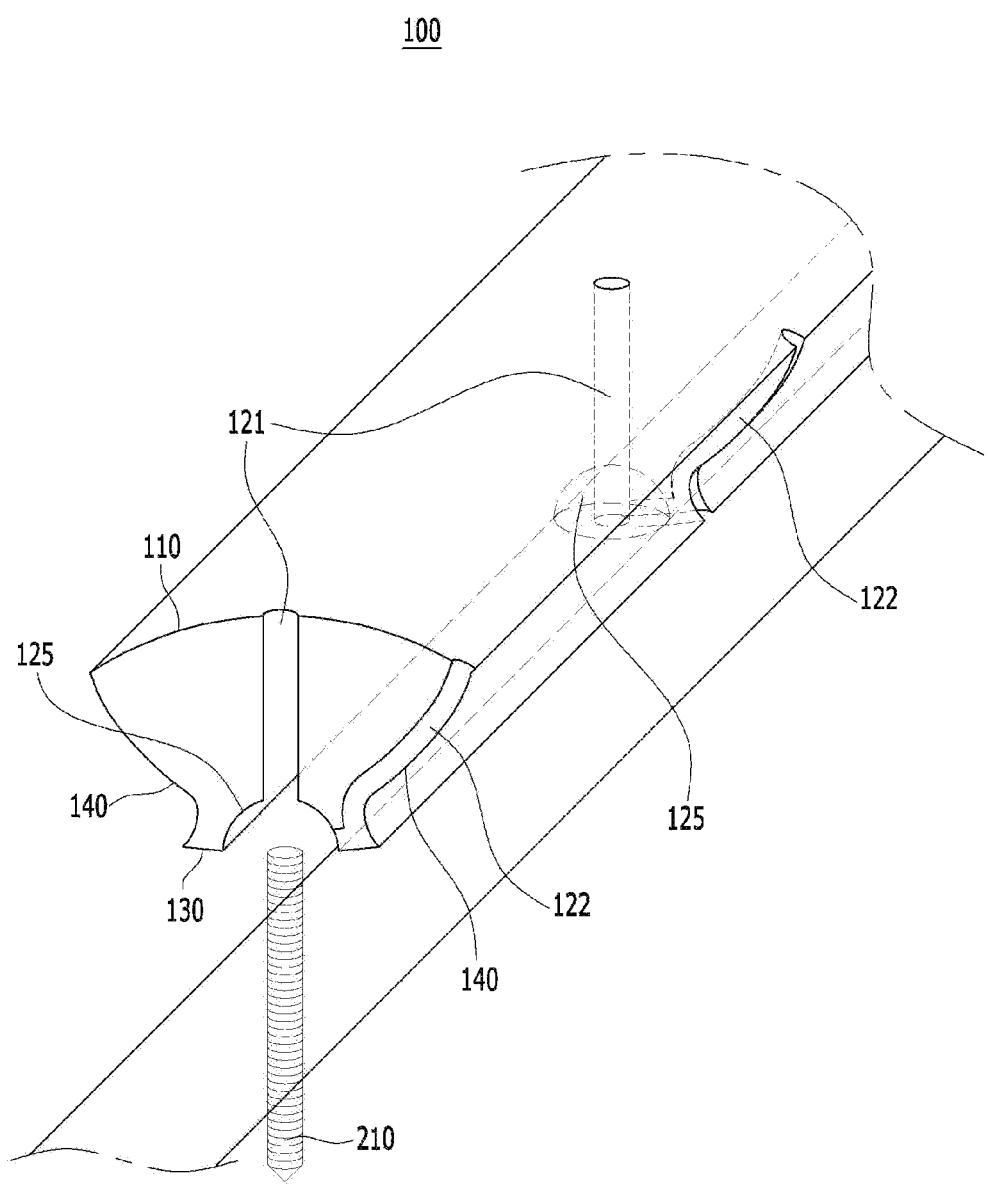
FIG. 4 is a view illustrating a state in which a fluid receiving part of the insert for a tire according to the exemplary embodiment of the present application is connected to the fluid injection part of the rim and the flow path.

FIG. 4 is a view illustrating a state in which the fluid receiving part of the insert for a tire according to the exemplary embodiment of the present application is connected to the fluid injection part and the flow paths.

In the case in which the through flow path 121 and the lateral flow path 122 are indirectly connected to the fluid injection part 210, the through flow path 121 and the lateral flow path 122 may be connected to the fluid injection part 210 through the fluid receiving part 125.

That is, the through flow path 121, the lateral flow path 122, or the lower flow path 124 may be connected to the fluid injection part 210 through the fluid receiving part 125. Referring to FIG. 4, for example, the fluid receiving part 125 may be provided in a hemispheric shape, and a diameter of the fluid receiving part 125 may be larger than a diameter of a horizontal cross section of the fluid injection part 210. However, the present disclosure is not limited thereto, and the fluid receiving part 125 may be provided in various shapes. In addition, a diameter of the fluid receiving part 125 may be equal to or larger than a diameter or a width of the through flow path 121, the lateral flow path 122, or the lower flow path 124, but the present disclosure is not limited thereto.

Since the insert 100 for a tire according to the exemplary embodiment of the present application includes the fluid receiving part 125, the fluid injected through the fluid injection part 210 may easily reach the upper space of the insert 100 through the through flow path 121 or the lateral flow path 122 even though the portion of the through flow path 121, the portion of the lateral flow path 122, and the portion of the fluid injection part 210, which are connected to one another, do not accurately match one another.

According to the exemplary embodiment of the present application, the insert 100 may include upper grooves 111, a lower groove 131, lateral grooves 141, an inner hollow portion 150, or combinations thereof, but the present disclosure is not limited thereto.

(a) of FIG. 5 and (b) of FIG. 5 are views illustrating examples of the upper groove, the lower groove, the lateral groove, the inner hollow portion, and the like of the insert for a tire according to the exemplary embodiment of the present application.

The upper groove 111, the lower groove 131, the lateral groove 141, or the inner hollow portion 150 may reduce a weight of the insert 100 and enable the insert 100 to elastically absorb impact. For example, even though an upper portion of the insert 100 is pressed by external force, the insert 100 may be recessed to a vacant space of the inner hollow portion 150 and then restored to an original shape and an original position because the insert 100 includes the inner hollow portion 150, such that it is possible to reduce impact to be applied to a lower portion of the insert 100. For this reason, ride quality may be improved when the transportation means including the insert 100 operates (travels).

The upper groove 111 may mean a groove formed in the upper surface 110 of the insert. More specifically, the upper groove 111 may mean a groove recessed in the direction from the upper surface 110 of the insert to the lower surface 130 of the insert. Referring to (a) of FIG. 5, for example, the upper grooves 111 may be formed in irregular shapes and at irregular intervals. As another example, the upper grooves 111 may be formed in regular shapes and at regular intervals. As still another example, the upper groove 111 may be continuously formed to have a predetermined cross-sectional shape, but the present disclosure is not limited thereto.

The lower groove 131 may mean a groove formed in the lower surface 130 of the insert. More specifically, the lower groove 131 may mean a groove recessed in the direction from the lower surface 130 of the insert to the upper surface 110 of the insert. Referring to (a) of FIG. 5, for example, the lower groove 131 may be continuously formed to have a predetermined cross-sectional shape, but the present disclosure is not limited thereto. Meanwhile, the lower groove 131 may serve as the lower flow path 124 (see FIG. 3).

The lateral groove 141 may mean a groove formed in the lateral surface 140 of the insert. More specifically, the lateral groove 141 may mean a groove recessed toward a center of the inside of the insert 100 from the lateral surface 140 of the insert. Referring to (a) of FIG. 5, for example, the lateral groove 141 may be recessed to have a non-uniform depth. As another example, the lateral groove 141 may be recessed to have a uniform depth, but the present disclosure is not limited thereto. Meanwhile, the lateral groove 141, which is positioned at a relatively right upper side among the lateral grooves 141 illustrated in FIG. 5, may merge with the upper groove 111. Meanwhile, the lateral groove 141 may serve as the lateral flow path 122 (see FIG. 3). Meanwhile, in the case in which the insert 100 for a tire according to the exemplary embodiment of the present application includes the lateral groove 141, a tool (e.g., a lever) may be fitted into the lateral groove 141 when the insert 100 for a tire according to the exemplary embodiment of the present application is fastened together with the rim 200 and the tire 300, such that the insert 100 may be easily fastened (mounted). Meanwhile, depths and shapes of the upper groove 111, the lower groove 131, and the lateral groove 141 are not limited to those illustrated in FIG. 5.

The inner hollow portion 150 may mean a hole formed in the insert 100. Referring to (b) of FIG. 5, for example, the inner hollow portion 150 may mean a hole having a circular cross section and continuously formed in the insert 100, but the present disclosure is not limited thereto. In this case, a cross section and a size of the cross section of the inner hollow portion 150 may vary depending on various exemplary embodiments.

The insert 100 for a tire according to the exemplary embodiment of the present application may include a combination of one or more of the upper groove 111, the lower groove 131, the lateral groove 141, and the inner hollow portion 150. For example, the insert 100 may include a through hole including the upper groove 111, the inner hollow portion 150, and the lower groove 131 which are connected to one another, but the present disclosure is not limited thereto.

According to the exemplary embodiment of the present application, the inner hollow portion 150 may include an opening portion formed in the direction of the lower surface 130 of the insert, and two ends of the opening portion may be mechanically or chemically bound, but the present disclosure is not limited thereto.

(a) of FIG. 6 is a view illustrating a state in which the opening portion of the inner hollow portion of the insert for a tire according to the exemplary embodiment of the present application is opened, and (b) of FIG. 6 is a view illustrating a state in which the opening portion of the inner hollow portion of the insert for a tire according to the exemplary embodiment of the present application is bound.

Referring to (a) of FIG. 6, the inner hollow portion 150 may be opened in the direction of the lower surface 130. When the opening portion is in the opened state, the inner hollow portion 150 may not be the hole formed in the insert 100 any further. Meanwhile, as the inner hollow portion 150 is opened, the lower portion of the insert 100 may be separated toward two sides. Referring to (b) of FIG. 6, the two sides of the lower portion of the insert 100, which are illustrated as being separated in (a) of FIG. 6, that is, the two ends of the opening portion may be bound. In this case, the methods of binding the two ends of the opening portion may be understood as broadly including binding methods such as mechanical binding or chemical binding that may form the hole in the insert 100 again.

According to the exemplary embodiment of the present application, the lower groove 131 may include protruding portions, but the present disclosure is not limited thereto.

(a) of FIG. 7 and (b) of FIG. 7 are views illustrating examples of protruding portions in the lower groove of the insert for a tire according to the exemplary embodiment of the present application.

It can be seen that the lower groove 131 of the insert is opened in the direction of the lower surface 130 in accordance with a point of view. In this case, the lower groove 131 may be structured such that the two sides of the lower portion of the insert 100, which face each other with the lower groove 131 interposed therebetween, may be at least partially bound. An example of the structure, which may be bound, will be specifically described with reference to FIG. 7.

Referring to FIG. 7, the protruding portion 132 may be formed to protrude in the direction from an inner surface of the lower groove 131 to a vacant space in the lower groove 131. Referring to (a) of FIG. 7, for example, the protruding portions 132 may be formed at both sides of the lower portion of the insert 100 with the lower groove 131 interposed therebetween. In addition, the protruding portions 132 may be continuously formed in a circumferential direction along the lower surface 130 of the insert. The protruding portions 132 may be staggered in a vertical direction and bound to overlap each other.

As another example, referring to (b) of FIG. 7, the plurality of protruding portions 132 may be formed at both sides of the lower portion of the insert 100 with the lower groove 131 interposed therebetween, and the plurality of protruding portions 132 may be formed at predetermined intervals in the circumferential direction along the lower surface 130 of the insert. The protruding portions 132 may be bound to overlap one another in the vertical direction. In this case, portions, which correspond to the intervals between the plurality of protruding portions 132 formed at the predetermined intervals, may be still opened. Therefore, the fluid, which is injected from the fluid injection part 210 (see FIG. 3) as described above, may move along the internal space of the lower groove 131, such that the lower groove 131 may serve as the lower flow path 124 (see FIG. 3).

In the case in which the lower portion of the insert 100 for a tire according to the exemplary embodiment of the present application is opened in the direction of the lower surface 130, the two sides of the lower portion of the insert 100 are bound, such that the insert 100 may be fixed in place when the insert 100 is fastened together with the rim 200 and the tire 300. Therefore, it is possible to prevent a safety accident that may occur as the insert 100 is separated from the rim 200 and the tire 300 during traveling.

According to the exemplary embodiment of the present application, the insert 100 may include the upper groove 111 having a slit shape, the lower groove 131, or the through hole, and a horizontal width of the slit may be smaller than a length between two hooks 220 of the rim 200, but the present disclosure is not limited thereto.

For example, the through hole may be formed in a cylindrical shape penetrating the lower surface 130 and the upper surface 110 of the insert 100, but the present disclosure is not limited thereto.

(a) of FIG. 8 is a view illustrating a state in which the insert for a tire according to the exemplary embodiment of the present application, which has the upper groove having a slit shape, is fastened to the rim, and (b) of FIG. 8 is an enlarged view of the slit-shaped upper groove of the insert for a tire illustrated in (a) of FIG. 8 when viewed from above.

Referring to (a) of FIG. 8 and (b) of FIG. 8, for example, a horizontal width d of the slit of the upper groove 111 may be smaller than a length 1 between the two hooks 220 of the rim 200. If the horizontal width d of the slit of the upper groove 111 is equal to or larger than the length 1 between the two hooks 220 of the rim 200, a thickness of the insert 100, which may be disposed above the two hooks 220 of the rim 200 to protect the rim 200 when external impact is applied during traveling, is relatively smaller than a thickness of the insert 100 when the horizontal width d of the slit is smaller than the length 1 between the two hooks 220 of the rim 200. For this reason, a relatively larger impact may be applied to the two hooks 220 of the rim 200.

In addition, referring to (a) of FIG. 8 and (b) of FIG. 8, the plurality of slit-shaped upper grooves 111 may be provided at predetermined intervals. A vertical width s of one slit-shaped upper groove 111, among the plurality of slit-shaped upper grooves 111, may be within a predetermined range. If the vertical width s of the slit of the upper groove 111 exceeds the predetermined range, force with which the insert 100 spreads the tire 300 in the direction toward both sides is insufficient, and as a result, rolling resistance may be increased.

The configurations related to the horizontal width d of the slit and the vertical width s of the slit may be equally applied to the slit-shaped lower groove 131 or the slit-shaped through hole. In this case, the horizontal width d of the slit may mean a width above upper end surfaces of the two hooks 220 of the rim 200.

According to the exemplary embodiment of the present application, the lower groove 131 or the inner hollow portion 150 may include an inner pleated portion, but the present disclosure is not limited thereto.

(a) of FIG. 9 is a view illustrating the insert for a tire according to the exemplary embodiment of the present application having the lower groove, and (a') of FIG. 9 is a view illustrating the inner pleated portion of the lower groove of the insert for a tire illustrated in (a) of FIG. 9 and (b) of FIG. 9 is a view illustrating the insert for a tire according to the exemplary embodiment of the present application having the inner hollow portion, and (b') of FIG. is a view illustrating the inner pleated portion of the inner hollow portion of the insert for a tire illustrated in (b) of FIG. 9.

Referring to (a') of FIG. 9 and (b') of FIG. 9, more specifically, the inner pleated portion may be formed on the inner surface of the insert which is directed toward the upper surface 110 of the insert. When the fluid is injected into the tire, the insert 100 is compressed and retracted (shrunk) in a direction in which the insert relatively receives force, that is, in the direction from the upper surface 110 to the lower surface 130. Therefore, when the inner pleated portion is formed on the inner surface of the lower groove 131 or the inner hollow portion 150 which is directed toward the upper surface 110, it is possible to prevent the insert from being retracted (shrunk). In addition, since the insert is prevented from being retracted (shrunk), it is possible to prevent rolling resistance from increasing.

According to the exemplary embodiment of the present application, the lateral surface 140 of the insert may be concave or convex with respect to the center of the inside of the insert 100, but the present disclosure is not limited thereto.

FIG. 10 is a view illustrating an example of a lateral side of the insert for a tire according to the exemplary embodiment of the present application.

Referring to FIG. 10, the lateral surface 140 of the insert may be concave or convex with respect to the center of the inside of the insert 100. More specifically, referring to the dotted line having dots having a relatively short length and illustrated in FIG. 10, the configuration in which the lateral surface 140 of the insert is concave with respect to the center of the inside of the insert 100 may mean that the insert 100 has a shape concave with respect to the center of the inside of the insert 100. In this case, the insert 100 may be more easily fastened to (mounted on) the rim 200 and the tire 300 in comparison with a case in which the lateral surface 140 of the insert has a shape indicated by the solid line. In addition, a volume of the insert 100 may be reduced, such that a weight of the insert 100 and manufacturing costs may be reduced.

Meanwhile, referring to the dotted line having dots having a relatively long length and illustrated in FIG. 10, the configuration in which the lateral surface 140 of the insert is convex toward the center of the inside of the insert 100 may mean that the insert 100 has a shape convex with respect to the center of the inside of the insert 100. In this case, this configuration may be advantageous in terms of impact absorption because a thickness of the portion, which may absorb impact applied to the rim 200, is increased. In addition, the force with which the insert 100 pushes (spreads) the inner surface of the tire in the direction toward both sides may be increased, thereby reducing rolling resistance.

According to the exemplary embodiment of the present application, in the state in which the insert 100 for a tire, the tire 300, and the rim 200 are coupled, a ratio $h_i/h_t$ of a maximum height $h_i$ of the insert 100 from an imaginary horizontal surface between the two hooks 220 of the rim 200 to a maximum height $h_t$ of an interior of the tire 300 from the imaginary horizontal surface between the two hooks 220 of the rim 200 may be 0.15 to 0.9, but the present disclosure is not limited thereto.

FIG. 11 is a view illustrating the maximum height of the interior of the tire from the imaginary horizontal surface between the two hooks of the rim and the maximum height of the insert from the imaginary horizontal surface between the two hooks of the rim in the state in which the insert for a tire according to the exemplary embodiment of the present application is coupled to the tire and the rim.

For example, the imaginary horizontal surface between the two hooks 220 of the rim 200 may be a horizontal surface formed by extending the upper end surface of the hook 220, but the present disclosure is not limited thereto. For example, the maximum height $h_t$ of the interior of the tire 300 may mean a height of the inner surface of the tire 300 which is most distant in the direction from the imaginary horizontal surface between the hooks 220 to the portion where the tire 300 comes into contact with the ground surface, but the present disclosure is not limited thereto. For example, the maximum height $h_i$ of the insert 100 may mean a height of the upper surface 110 of the insert which is most distant in the direction from the imaginary horizontal surface between the hooks 220 to the interior of the tire 300, but the present disclosure is not limited thereto.

Hereinafter, the insert for a tire according to the exemplary embodiment of the present application will be described with reference to the following examples, but the following examples are provided only for the purpose of explanation but not intended to limit the scope of the present application.

Example 1

As a condition of Example 1, a Maxxis-Minion DHR 2 (27.5×2.3) tire was used, and an air pressure in the tire was 10 psi.

In an experimental method of Example 1, the tire coupled to the insert was installed on a pressure measurement device called a load cell, a weight of 5 kg was dropped onto the tire from a height of 300 mm, the amount of force or load (kgf) applied to the load cell for each time was measured, and a maximum load point (kgf) thereof was selected as an index for evaluating impact absorption performance.

In Example 1, the vibration was measured by using a vibration measurer capable of measuring in μm units by bringing the tire into contact with a drum and rotating the drum. In this case, a speed of the drum was 20 km/h, and a weight of the drum was 45 kg. The vibration was measured for 10 minutes after starting the operation, and an average value was obtained. For reference, measured vibration values shown in the following Table 1 are displacement values. For example, the measured vibration value of 100 μm means that the vibration is generated with a width of 1 mm, and specifically, means that the vibration moves to the left by 0.5 mm and to the right by 0.5 mm.

In Example 1, rebound resilience was measured by setting a center, at which the tire and the insert were mounted, as a drop point, dropping a weight of 500 g from a height of 1 m, and measuring a height at which the weight additionally bounced by elasticity.

Meanwhile, the impact absorption performance, which is evaluated using the maximum load point as an index, relates to impact applied to the rim 200 or the tire 300 to the extent that the rim 200 or the tire 300 cannot be reusable, and the impact absorption performance, which is evaluated using the vibration as an index, relates to lower impact that allows the transportation means to continue traveling.

In addition, the rebound resilience is an index that may indicate restoring force of the insert 100, and it can be determined that the rolling resistance decreases as the restoring force increases, that is, the rebound resilience increases. In addition, considering that the solid has lower rebound resilience than the gas, when the ratio $h_i/h_t$ of the maximum height $h_i$ of the insert 100 from the imaginary horizontal surface between the two hooks 220 of the rim 200 to the maximum height $h_t$ of the interior of the tire 300 from the imaginary horizontal surface between the two hooks 220 of the rim 200 increases, a ratio of the solid (e.g., the insert) to the gas (e.g., air) in the tire 300 increases, such that the rebound resilience may decrease, and thus the rolling resistance value may increase.

Based on the ratio $h_i/h_t$ of the maximum height $h_i$ of the insert 100 from the imaginary horizontal surface between the two hooks 220 of the rim 200 to the maximum height $h_t$ of the interior of the tire 300 from the imaginary horizontal surface between the two hooks 220 of the rim 200, the maximum load point, the vibration, and the rebound resilience were measured by the experiment, and the result of comprehensively determining suitability/non-suitability based on the measurement result is shown in the following Table 1.

<Evaluation Criteria>

Impact absorption performance: the impact absorption performance is evaluated as satisfying an appropriate level when the maximum load point is 50 kgf or less.

Impact absorption performance and ride quality: the impact absorption performance against low impact is evaluated as satisfying an appropriate level and the ride quality is evaluated as being satisfied when the vibration (amplitude of the vibration of the tire) is 250 μm or less.

Rolling resistance: the rolling resistance value is evaluated as satisfying a predetermined range (appropriate level) when the rebound resilience is 30 cm or more.

Suitable (O): a state in which the maximum load point is 50 kgf or less, the vibration is 250 μm or less, and the rebound resilience is 30 cm or more is evaluated as being suitable.

Unsuitable (X): a state in which the maximum load point is higher than 50 kgf, the vibration is larger than 250 μm, or the rebound resilience is smaller than 30 cm is evaluated as being unsuitable.

TABLE 1

| Ratio ($h_i/h_t$) | Maximum Load Point (kgf) | Vibration (μm) | Rebound Resilience (cm) | Suitable/ Unsuitable |
|---|---|---|---|---|
| 0 | 85 | 15 | 56 | X |
| 0.1 | 72 | 41 | 55 | X |
| 0.15 | 49 | 62 | 54 | ○ |
| 0.2 | 37 | 82 | 53 | ○ |
| 0.3 | 34 | 105 | 52 | ○ |
| 0.4 | 30 | 127 | 51 | ○ |
| 0.5 | 28 | 139 | 47 | ○ |
| 0.6 | 24 | 157 | 44 | ○ |
| 0.7 | 19 | 184 | 42 | ○ |
| 0.8 | 13 | 235 | 36 | ○ |
| 0.9 | 10 | 248 | 31 | ○ |
| 1 | 8 | 250 | 19 | X |

According to the result shown in Table 1, when the ratio $h_i/h_t$ of the maximum height $h_i$ of the insert 100 from the imaginary horizontal surface between the two hooks 220 of the rim 200 to the maximum height $h_t$ of the interior of the tire 300 from the imaginary horizontal surface between the two hooks 220 of the rim 200 is smaller than 0.15, the impact absorption performance cannot satisfy the appropriate level, and a function of absorbing impact applied to the tire 300 from the outside may deteriorate. For example, when the tire collides with a protruding object in a state in which air pressure in the tire is low or when the tire bounces into the air and then lands on the road surface, the tire 300 and the road surface come into close contact with the rim 200, such that pinch flat or snakebite (similar to a shape having four holes formed when a snake bites) puncture may occur, and the rim 200 may also be damaged.

In contrast, when the ratio $h_i/h_t$ of the maximum height $h_i$ of the insert 100 from the imaginary horizontal surface between the two hooks 220 of the rim 200 to the maximum height $h_t$ of the interior of the tire 300 from the imaginary horizontal surface between the two hooks 220 of the rim 200 is larger than 0.9, the rolling resistance value cannot satisfy the predetermined range (appropriate level). In this case, because the interior of the tire 300 is mostly filled with the insert 100 which is a solid, the rolling resistance value may be further increased than the criterion to be satisfied. In addition, an overall weight of the tire may increase.

According to the exemplary embodiment of the present application, in a state in which the insert 100 for a tire, the tire 300, and the rim 200 are coupled, the insert 100 for a tire has hardness equal to or higher than Shore C hardness of 20 and equal to or lower than Shore A hardness of 90, and a ratio $w_i/w_t$ of a horizontal/transverse diameter $w_i$ of the insert 100 to a horizontal/transverse diameter $w_t$ of the tire 300 may be 0.1 to 1.3, but the present disclosure is not limited thereto.

FIG. 12 is a view illustrating a horizontal/transverse diameter of the tire and a horizontal/transverse diameter of the insert in the state in which the insert for a tire according to the exemplary embodiment of the present application is coupled to the tire and the rim.

In this case, for example, the horizontal/transverse diameter $w_t$ of the tire 300 may mean a length between two portions of the inner surface of the tire 300 which are most distant from each other in the horizontal direction based on the drawings, but the present disclosure is not limited thereto. For example, the horizontal/transverse diameter $w_i$ of the insert 100 may mean a length between two portions of the lateral surface 140 of the insert 100 which are most distant from each other in the horizontal direction based on the drawing, but the present disclosure is not limited thereto. In this case, the lateral surface 140 may mean a surface that may be in contact with the inner surface of the tire 300.

Hereinafter, the insert for a tire according to the exemplary embodiment of the present application will be described with reference to the following examples, but the following examples are provided only for the purpose of explanation but not intended to limit the scope of the present application.

Example 2

As a condition of Example 2, a Maxxis-Minion DHR 2 (27.5×2.3) tire was used, and an air pressure in the tire was 10 psi. In addition, the tire horizontal/transverse diameter was set to 55 mm, the horizontal/transverse diameter of the insert was adjusted within a range of 5.5 mm or more and 110 mm or less, and then the experiment was performed. That is, the insert in which the ratio $w_i/w_t$ of the horizontal/transverse diameter of the insert to the horizontal/transverse diameter of the tire was increased by 0.1 within a range of 0.1 or more and 2 or less was used.

The hardness in Example 2 was adjusted by a foaming rate under the same mixing condition. In addition, the hardness of the insert 100 was measured by applying a hardness test method based on ASTM D 2240. The insert in which the hardness according to the foaming amount is increased by 10 within a range of Shore C hardness of 10 or more, Shore C hardness of 90 or less, Shore A hardness of 10 or more, and Shore A hardness of 90 or less was used.

In other words, the experiment was performed on the insert having Shore C hardness of 10 or more and Shore A hardness of 90 or less for each ratio $w_i/w_t$ of the horizontal/transverse diameter of the insert to the horizontal/transverse diameter of the tire. However, the experiment for measuring the rolling resistance, the vibration, and the rebound resilience used the insert 100 having the hardness typically used within the hardness range (Shore C hardness is 20 or more and Shore A hardness is 90 or less; see the following Table 3) that was determined as being suitable for the experiment based on the hardness and the ratio of the horizontal/transverse diameter.

A rim-off Test was performed as an experimental method in Example 2. The rim-off test refers to a test that measures a force applied when the tire is separated from the hooks of the rim as the force is applied to the lateral surface of the tire in the state in which the tire engages with the hooks of the rim.

The rolling resistance in Example 2 was measured by using a torque cell by rotating a drum in a state in which the tire was in contact with the drum. In this case, a speed of the drum was 25 km/h, and a weight of the drum was 45 kg. For reference, in the following Table 2, the watt (W) of the rolling resistance values are values made by converting torque values (N-m) into power consumption (W), and the force required to roll the tire decreases as the rolling resistance value decreases.

In Example 2, the vibration was measured by using a vibration measurer capable of measuring in μm units by bringing the tire into contact with a drum and rotating the drum. In this case, a speed of the drum was 20 km/h, and a weight of the drum was 45 kg. The vibration was measured for 10 minutes after starting the operation, and an average value was obtained.

In Example 2, rebound resilience was measured by setting a center, at which the tire and the insert were mounted, as a drop point, dropping a weight of 500 g from a height of 1 m, and measuring a height at which the weight additionally bounced by elasticity.

<Evaluation Criteria>

Rolling resistance: the rolling resistance value is evaluated as being at an appropriate level when the rolling resistance is 120 W or less.

Vibration: the vibration is evaluated as being at an appropriate level when the vibration is 500 μm or less.

Rebound resilience: the rebound resilience value is evaluated as being at an appropriate level when the rebound resilience value is 30 cm or more and 90 cm or less.

Suitable (O): a state in which a highest load value at which the detachment occurs when the rim-off test is performed after the insert is fastened is larger than a highest load value at which the detachment occurs when the rim-off test is performed in a state in which the insert is not fastened to the tire and mounting force of the tire (the highest load value) increases in accordance with the increase in hardness is evaluated as being suitable.

Unsuitable (X): a state in which the highest load value at which the detachment occurs when the rim-off test is performed after the insert is fastened is equal to or smaller than the highest load value at which the detachment occurs when the rim-off test is performed in the state in which the insert is not fastened to the tire is evaluated as being unsuitable, and a state in which the mounting force of the tire (the highest load value) does not increase in accordance with the increase in hardness is evaluated as being unsuitable even though the highest load value at which the detachment occurs when the rim-off test is performed after the insert is fastened is larger than the highest load value at which the detachment occurs when the rim-off test is performed in the state in which the insert is not fastened to the tire.

TABLE 2

| Ratio ($w_i/w_t$) | Rolling Resistance (W) | Vibration (μm) | Rebound Resilience (cm) |
| --- | --- | --- | --- |
| 0 | 62 | 15 | 55 |
| 0.1 | 62 | 20 | 55 |
| 0.2 | 62 | 20 | 55 |
| 0.3 | 62 | 20 | 55 |
| 0.4 | 62 | 20 | 53 |
| 0.5 | 62 | 20 | 52 |
| 0.6 | 62 | 20 | 50 |
| 0.7 | 62 | 20 | 49 |
| 0.8 | 62 | 20 | 48 |
| 0.9 | 62 | 25 | 47 |
| 1 | 62 | 30 | 46 |
| 1.1 | 60 | 32 | 45 |
| 1.2 | 57 | 33 | 45 |
| 1.3 | 56 | 38 | 44 |
| 1.4 | X | X | X |
| 1.5 | X | X | X |
| 1.6 | X | X | X |
| 1.7 | X | X | X |
| 1.8 | X | X | X |
| 1.9 | X | X | X |
| 2 | X | X | X |

TABLE 3

| Ratio ($w_i/w_t$) | Shore C Hardness | | | | | | | | | Shore A Hardness | | | | | | | | |
| --- | --- | --- | --- | --- | --- | --- | --- | --- | --- | --- | --- | --- | --- | --- | --- | --- | --- | --- |
| | 10 | 20 | 30 | 40 | 50 | 60 | 70 | 80 | 90 | 10 | 20 | 30 | 40 | 50 | 60 | 70 | 80 | 90 |
| 0 | X | X | X | X | X | X | X | X | X | X | X | X | X | X | X | X | X | X |
| 0.1 | X | O | O | O | O | O | O | O | O | O | O | O | O | O | O | O | O | O |
| 0.2 | X | O | O | O | O | O | O | O | O | O | O | O | O | O | O | O | O | O |
| 0.3 | X | O | O | O | O | O | O | O | O | O | O | O | O | O | O | O | O | O |
| 0.4 | X | O | O | O | O | O | O | O | O | O | O | O | O | O | O | O | O | O |
| 0.5 | X | O | O | O | O | O | O | O | O | O | O | O | O | O | O | O | O | O |
| 0.6 | X | O | O | O | O | O | O | O | O | O | O | O | O | O | O | O | O | O |
| 0.7 | X | O | O | O | O | O | O | O | O | O | O | O | O | O | O | O | O | O |
| 0.8 | X | O | O | O | O | O | O | O | O | O | O | O | O | O | O | O | O | O |
| 0.9 | X | O | O | O | O | O | O | O | O | O | O | O | O | O | O | O | O | O |
| 1 | X | O | O | O | O | O | O | O | O | O | O | O | O | O | O | O | O | O |
| 1.1 | X | O | O | O | O | O | O | O | O | O | O | O | O | O | O | O | O | O |
| 1.2 | X | O | O | O | O | O | O | O | O | O | O | O | O | O | O | O | O | O |
| 1.3 | X | O | O | O | O | O | O | O | O | O | O | O | O | O | O | O | O | O |
| 1.4 | X | X | X | X | X | X | X | X | X | X | X | X | X | X | X | X | X | X |
| 1.5 | X | X | X | X | X | X | X | X | X | X | X | X | X | X | X | X | X | X |
| 1.6 | X | X | X | X | X | X | X | X | X | X | X | X | X | X | X | X | X | X |
| 1.7 | X | X | X | X | X | X | X | X | X | X | X | X | X | X | X | X | X | X |
| 1.8 | X | X | X | X | X | X | X | X | X | X | X | X | X | X | X | X | X | X |
| 1.9 | X | X | X | X | X | X | X | X | X | X | X | X | X | X | X | X | X | X |
| 2 | X | X | X | X | X | X | X | X | X | X | X | X | X | X | X | X | X | X |

According to the result shown in Table 3, when the hardness of the insert 100 is less than Shore C hardness of 20, the insert 100 is not fixed and may be easily separated from the rim 200 during traveling even though the insert 100 is fastened (mounted) together with the rim 200 and the tire 300. This means that there is no advantageous effect in terms of the mounting force of the tire 300 in comparison with the state in which the insert 100 is not fastened. In addition, the rolling resistance value may be larger than the criterion to be satisfied. When the hardness of the insert 100 is less than a predetermined level in the state in which the insert 100, the rim 200, and the tire 300 are fastened, a strain rate of the tire 300 may be increased, and thus a value to be converted into thermal energy is increased, such that the rolling resistance value may be larger than the criterion to be satisfied.

In contrast, when the hardness of the insert 100 is higher than Shore A hardness of 90, it may be difficult to fasten (mount) the insert 100 together with the rim 200 and the tire 300 by a method being typically used. In addition, when the hardness of the insert 100 is large enough to exceed a predetermined level, the impact absorption performance during traveling may deteriorate. Therefore, the amount of impact transmitted to the rim 200 is large, and as a result, the rim 200 may be damaged.

In addition, according to the results shown in Tables 2 and 3, when the ratio $w_i/w_t$ of the horizontal/transverse diameter $w_i$ of the insert 100 to the horizontal/transverse diameter $w_t$ of the tire 300 exceeds 1.3, it may be difficult to fasten the insert 100 together with the rim 200 and the tire 300 by a method being typically used.

In addition, according to the result shown in Table 2, when the ratio $w_iN_t$ of the horizontal/transverse diameter $w_i$ of the insert 100 to the horizontal/transverse diameter $w_t$ of the tire 300 is less than 0.1, there may be no advantageous effect in terms of the mounting force of the tire 300 in comparison with the state in which the insert 100 is not fastened. In addition, a function of the insert 100 for protecting the rim 200 from external impact may deteriorate.

Meanwhile, referring to Table 2, it can be ascertained that the rolling resistance value decreases as the ratio $w_i/w_t$ begins to be larger than 1 (i.e., the horizontal/transverse diameter of the insert 100 begins to be larger than the horizontal/transverse diameter of the tire 300). As the horizontal/transverse diameter of the insert 100 having the predetermined hardness begins to be larger than the horizontal/transverse diameter of the tire 300, the portion (area) of the tire 300 where friction occurs with the ground surface is changed, that is, specifically, a width of the portion of the tire 300 where the friction occurs with the ground surface is increased in a direction perpendicular to the direction in which the tire 300 moves. This plays a key role in decreasing the rolling resistance value.

For example, when the width is 60 mm and the width when the tire having air pressure of 10 psi comes into contact with the ground surface is 65 mm, the width when the tire comes into contact with the ground surface becomes larger than 65 mm when the horizontal/transverse diameter of the insert inserted into the tire becomes larger than the horizontal/transverse diameter of the tire. This is because the insert stretches the tire in the direction of the horizontal/transverse diameter.

In general, it can be said that the rolling resistance value increases as the rebound resilience value decreases. As the specific gravity of air (gas) in the tire increases, the rebound resilience value increases, and the rolling resistance value decreases. However, referring to Table 2, it can be ascertained that as the horizontal/transverse diameter of the insert 100 increases, the rolling resistance value decreases even though the rebound resilience value decreases. That is, it can be seen that when the horizontal/transverse diameter of the insert 100 becomes larger than the horizontal/transverse diameter of the tire 300 (i.e., when the ratio $w_i/w_t$ is larger than 1), the effect of decreasing the rolling resistance value due to the change in ground contact area of the tire 300 is greater than the effect of increasing the rolling resistance value in accordance with the decrease in rebound resilience value. In other words, when the ratio $w_i/w_t$ of the horizontal/transverse diameter $w_i$ of the insert 100 to the horizontal/transverse diameter $w_t$ of the tire 300 exceeds 1, the rolling resistance value decreases even though the rebound resilience value decreases.

According to the exemplary embodiment of the present application, the tire 300 may be a tubeless tire, but the present disclosure is not limited thereto.

Since the insert 100 is used for the tubeless tire, the impact absorption performance may be improved and the probability of damage to the rim 200 may be reduced in comparison with the tubeless tire in the related art in which no insert 100 is included.

A second aspect of the present application provides a tire fastening structure in which the insert 100 for a tire and the tire 300 are fastened to the rim 200.

Regarding the tire fastening structure according to the second aspect of the present application, a detailed description of the parts, which have been described in the first aspect of the present application, will be omitted. Even though the description is omitted, the contents disclosed in the first aspect of the present application may be equally applied to the second aspect of the present application.

A third aspect of the present application provides a transportation means (vehicle) including the insert 100 for a tire.

The transportation means may be, for example, a bicycle, a vehicle, a motorcycle, a scooter, a wheelchair, a stroller, a kickboard, an electric kickboard, an electric wheel, an electric skate, a tricycle, a roller skate, a skateboard, a shopping cart, or a cart, but the present disclosure is not limited thereto.

Regarding the transportation means according to the third aspect of the present application, a detailed description of the parts, which have been described in the first and second aspects of the present application, will be omitted. Even though the description is omitted, the contents disclosed in the first and second aspects of the present application may be equally applied to the third aspect of the present application.

It will be appreciated that the exemplary embodiments of the present application have been described above for purposes of illustration, and those skilled in the art may understand that the present application may be easily modified in other specific forms without changing the technical spirit or the essential features of the present application. Therefore, it should be understood that the above-described exemplary embodiments are illustrative in all aspects and do not limit the present application. For example, each component described as a single type may be carried out in a distributed manner. Likewise, components described as a distributed type can be carried out in a combined type.

The scope of the present application is represented by the claims to be described below rather than the detailed description, and it should be interpreted that the meaning and scope of the claims and all the changes or modified forms derived from the equivalent concepts thereto fall within the scope of the present application.

What is claimed is:

1. An insert for a bicycle tubeless tire, the insert comprising:

an upper surface, a lower surface, and two lateral surfaces extending from the upper surface to the lower surface and facing each other, wherein, when the insert is inserted into a tire with a rim associated therewith, the upper surface is configured to be directed toward a tread of the tire and form an upper space between the upper surface and an inner surface of the tire, and the lower surface is configured to be directed toward the rim and form a lower space between the lower surface and the rim, wherein each of the two lateral surfaces comprises an upper lateral surface extending upward from an imaginary horizontal plane between two hooks of the rim to the upper surface and a lower lateral surface extending downward from the imaginary horizontal plane to the lower surface, wherein the upper lateral surface is in contact with an inner surface of the tire, and the lower lateral surface is at least partially spaced apart from the inner surface of the tire;

an inner hollow portion formed inside the insert to have an upper inner surface and two lateral inner surfaces extending from the upper inner surface to the lower surface of the insert and facing each other such that an inner hollow space defined by the upper inner surface and the two lateral inner surfaces has a shape substantially corresponding to an exterior of the insert, wherein the inner hollow portion includes an opening portion formed on the lower surface of the insert and extending along an inner circumference of the insert to enable the inner hollow space to be opened toward the rim; and a through flow path penetrating through the upper surface towards the inner hollow space of the inner hollow portion, wherein the through flow path is configured to flow a fluid from the lower space to the upper space via the inner hollow space when the fluid is injected through a fluid injection part formed in the rim, wherein the upper surface has a maximum width greater than that of the lower surface, and the maximum width of the lower surface exceeds a distance between two tire beads.

2. The insert of claim 1, further comprising: a lateral flow path formed in a lateral surface of the two lateral surfaces; and a coupling flow path connecting the through flow path to the lateral flow path.

3. The insert of claim 2, wherein the lateral flow path extends along the lateral surface, wherein the through flow path and the lateral flow path are directly or indirectly connected to the fluid injection part.

4. The insert of claim 2, further comprising: a lower flow path formed in the lower surface, wherein the through flow path and the lateral flow path are directly or indirectly connected to the fluid injection part through the lower flow path.

5. The insert of claim 4, further comprising: a fluid receiving part formed in the lower surface and connected to the fluid injection part, wherein the fluid receiving part is connected to the through flow path, the lateral flow path, or the lower flow path.

6. The insert of claim 1, further comprising: an upper groove, a lower groove, a lateral groove, or combinations thereof.

7. The insert of claim 6, wherein the lower groove comprises:
a protruding portion.

8. The insert of claim 6, wherein the upper groove has a slit shape, and a horizontal width of the slit shape is smaller than a length between the two hooks of the rim.

9. The insert of claim 6, wherein the lower groove or the inner hollow portion comprises: an inner pleated portion.

10. The insert of claim 1, wherein the insert has a ratio hi/ht of 0.15 to 0.9 where hi is a maximum height of the insert and ht is a maximum height of an interior of the tire, respectively, from the imaginary horizontal plane between the two hooks of the rim when the insert is inserted into the tire with the rim.

11. The insert of claim 1, wherein the insert has a hardness equal to or higher than Shore C hardness of 20 and equal to or lower than Shore A hardness of 90, and a ratio wi/wt of 0.1 to 1.3 where wi is a horizontal/transverse diameter wi of the insert, and wt is a horizontal/transverse diameter wt of the tire.

12. An assembly of a tire, a rim and the insert of claim 1.

13. The assembly of claim 12, wherein the tire is a tubeless tire.

* * * * *